US011816017B2

(12) United States Patent
Ren et al.

(10) Patent No.: US 11,816,017 B2
(45) Date of Patent: Nov. 14, 2023

(54) SYSTEMS AND METHODS FOR EVALUATING CODE CONTRIBUTIONS BY SOFTWARE DEVELOPERS

(71) Applicant: Merico, Inc., San Francisco, CA (US)

(72) Inventors: Jinglei Ren, Beijing (CN); Hezheng Yin, Albany, CA (US); Roland Vogl, Palo Alto, CA (US)

(73) Assignee: MERICO, INC., Palo Alto, CA (US)

( * ) Notice: Subject to any disclaimer, the term of this patent is extended or adjusted under 35 U.S.C. 154(b) by 0 days.

(21) Appl. No.: 17/773,744

(22) PCT Filed: Nov. 4, 2019

(86) PCT No.: PCT/CN2019/115270
§ 371 (c)(1),
(2) Date: May 2, 2022

(87) PCT Pub. No.: WO2021/087648
PCT Pub. Date: May 14, 2021

(65) Prior Publication Data
US 2022/0382541 A1     Dec. 1, 2022

(51) Int. Cl.
*G06F 8/71*     (2018.01)
*G06F 11/36*    (2006.01)
(Continued)

(52) U.S. Cl.
CPC ............ *G06F 11/3604* (2013.01); *G06F 8/36* (2013.01); *G06F 8/427* (2013.01); *G06F 8/71* (2013.01);
(Continued)

(58) Field of Classification Search
CPC ..... G06F 8/71; G06F 8/43; G06F 8/77; G06F 11/3608; G06F 8/36; G06F 8/427; G06F 8/75; G06F 11/3604; G06Q 10/06
See application file for complete search history.

(56) References Cited

U.S. PATENT DOCUMENTS

| 2014/0137088 A1 | 5/2014 | Mitchell | 717/143 |
| 2015/0309790 A1* | 10/2015 | Henriksen | G06F 8/43 717/121 |

(Continued)

FOREIGN PATENT DOCUMENTS

| CN | 102023921 | 4/2011 | G06F 11/36 |
| CN | 104281096 | 1/2015 | G05B 19/4093 |
| CN | 109947428 | 6/2019 | G06F 8/41 |

OTHER PUBLICATIONS

Jinglei Ren et al., "Towards Quantifying the Development Value of Code Contriburion" ESEC/FSE, pp. 4-9.
(Continued)

*Primary Examiner* — Tuan A Vu
(74) *Attorney, Agent, or Firm* — Maschoff Brennan

(57) ABSTRACT

A tool is provided for evaluating contributions of different software developers to a software project, which considers both the structural value and non-structural value of each developer's contributions. Source code for the project is parsed to generate abstract syntax trees (ASTs) representing the code at different times during the project. The tool may perform both a structural value analysis and a non-structural value analysis of the code contributions of each developer. The structural value analysis for each developer may include a call-commit analysis of a call-commit graph generated from the ASTs to analyze function calls and commits attributable to each developer. The non-structural value analysis for each software developer may include identifying and classifying commits attributable to each developer based on impact of such commits on the project. The tool may then calculate a development value score for each developer based on the structural and non-structural metrics for each developer.

20 Claims, 10 Drawing Sheets

(51) Int. Cl.
*G06F 8/36* (2018.01)
*G06F 8/41* (2018.01)
*G06F 8/75* (2018.01)
*G06Q 10/06* (2023.01)

(52) U.S. Cl.
CPC ............ *G06F 8/75* (2013.01); *G06F 11/3608* (2013.01); *G06Q 10/06* (2013.01)

(56) References Cited

U.S. PATENT DOCUMENTS

| | | |
|---|---|---|
| 2016/0274995 A1* | 9/2016 | Klein .................. G06F 11/3608 |
| 2020/0005219 A1* | 1/2020 | Stevens ..................... G06F 8/71 |
| 2020/0081814 A1* | 3/2020 | Srinivasan ................ G06F 8/71 |
| 2020/0150956 A1* | 5/2020 | Neatherway .............. G06F 8/71 |
| 2020/0225943 A1* | 7/2020 | van Schaik ............... G06F 8/77 |

OTHER PUBLICATIONS

Search Report & Written Opinion for International Application No. PCT/CN2019/11527, 10 pages.
Feist, M. D. et al., "Visualizing Project Evolution through Abstract Syntax Tree Analysis", IEEE Working Conference On Software Visualization (VISSOFT), pp. 11-20, Oct. 3, 2016.
Extended European Search Report issued in connection with corresponding EP Application No. 19951468.8 dated Jun. 23, 2023.

\* cited by examiner

```
patent.py 682 Bytes 1
 2    # modified from fibonacci
 3    def fibonacci_plus_one(n):
 4        if n<0:
 5            print("Incorrect input")          ← 310
 6        elif n==1:
 7            return 1
 8        elif n==2:
 9            return 2
10        else:
11            return fibonacci_plus_one(n-1)+fibonacci_plus_one(n-2)
12
13
14    # renamed and modified from bubble_sort
15    def bubble_sort_and_reverse(arr):
16        n = len(arr)
17        for i in range(n):                    ← 320
18            for j in range(0, n-i-1):
19                if arr[j] > arr[j+1] :
20                    arr[j], arr[j+1] = arr[j+1], arr[j]
21        arr = arr[::-1]
22
23
24    def main():
25        arr = []
26        for i in range(1, 31):
27            arr.append(fibonacci_plus_one(i))
28        bubble_sort_and_reverse(arr)
29        print(arr)
30
31    if __name__ == "__main__":
32        main()
33
```

*FIG. 3*

```
▼ 🗎 patent.py 0 → 100644

1    +
  2    + # to be modified in the next commit
  3    + def fibonacci(n):
  4    +     if n<0:
  5    +         print("Incorrect input")
  6    +     elif n==1:
  7    +         return 0
  8    +     elif n==2:
  9    +         return 1
 10    +     else:
 11    +         return fibonacci(n-1)+fibonacci(n-2)
 12    +
 13    +
 14    + # to be renamed and modified in the next commit
 15    + # this renaming will be detected by our algorithm
 16    + def bubble_sort(arr):
 17    +     n = len(arr)
 18    +     for i in range(n):
 19    +         for j in range(0, n-i-1):
 20    +             if arr[j] > arr[j+1] :
 21    +                 arr[j], arr[j+1] = arr[j+1], arr[j]
 22    +
 23    +
 24    + # to be deleted in the next commit
 25    + def reverse_array(arr):
 26    +     return arr[::-1]
 27    +
 28    +
 29    + def main():
 30    +     arr = []
 31    +     for i in range(1, 31):
 32    +         arr.append(fibonacci(i))
 33    +     bubble_sort(arr)
 34    +     print(reverse_array(arr))
 35    +
 36    + if __name__ == "__main__":
 37    +     main()
```

```
{
  "graph": {
    "commits": {
      "ff6f447c7d8a0a97d0ea472b4ca6b3f5edc59d93": {
        "id": "ff6f447c7d8a0a97d0ea472b4ca6b3f5edc59d93",
        "authorName": "Hezheng Yin",
        "authorEmail": "hezheng@meri.co",
        "message": "First commit\n"
      },
      "c66c28d398bbbc3a84fb8ce127476b55902b4aa2": {
        "id": "c66c28d398bbbc3a84fb8ce127476b55902b4aa2",
        "authorName": "Hezheng Yin",
        "authorEmail": "hezheng@meri.co",
        "message": "Second commit\n"
      }
    },
    "nodes": [
      {
        "id": "patent.py::fibonacci((n))::<GLOBAL>::3::11::186",
        "size": 39,
        "history": {
          "ff6f447c7d8a0a97d0ea472b4ca6b3f5edc59d93": {},
          "c66c28d398bbbc3a84fb8ce127476b55902b4aa2": {}
        },
        "added_by": "ff6f447c7d8a0a97d0ea472b4ca6b3f5edc59d93",
        "removed_by": "c66c28d398bbbc3a84fb8ce127476b55902b4aa2"
      },
      {
        "id": "patent.py::bubble_sort_and_reverse((arr))::<GLOBAL>::15::21::214",
        "size": 54,
        "history": {
          "ff6f447c7d8a0a97d0ea472b4ca6b3f5edc59d93": {},
          "c66c28d398bbbc3a84fb8ce127476b55902b4aa2": {}
        },
        "added_by": "ff6f447c7d8a0a97d0ea472b4ca6b3f5edc59d93",
        "removed_by": ""
      },
      {
        "id": "patent.py::reverse_array((arr))::<GLOBAL>::25::26::44",
        "size": 13,
        "history": {
          "ff6f447c7d8a0a97d0ea472b4ca6b3f5edc59d93": {},
          "c66c28d398bbbc3a84fb8ce127476b55902b4aa2": {}
        },
        "added_by": "ff6f447c7d8a0a97d0ea472b4ca6b3f5edc59d93",
        "removed_by": "c66c28d398bbbc3a84fb8ce127476b55902b4aa2"
      },
      {
        "id": "patent.py::main()::<GLOBAL>::24::29::141",
        "size": 32,
        "history": {
          "ff6f447c7d8a0a97d0ea472b4ca6b3f5edc59d93": {},
          "c66c28d398bbbc3a84fb8ce127476b55902b4aa2": {}
        },
        "added_by": "ff6f447c7d8a0a97d0ea472b4ca6b3f5edc59d93",
```

*FIG. 6-1*

```
    "added_by": "c66c28d398bbbc3a84fb8ce127476b55902b4aa2",
    "removed_by": ""
  }
],
"links": [
  {
    "added_by": "ff6f447c7d8a0a97d0ea472b4ca6b3f5edc59d93",
    "weight": null,
    "source": "patent.py::fibonacci((n))::<GLOBAL>::3::11::186",
    "target": "patent.py::fibonacci((n))::<GLOBAL>::3::11::186"
  },
  {
    "added_by": "ff6f447c7d8a0a97d0ea472b4ca6b3f5edc59d93",
    "weight": null,
    "source": "patent.py::main()::<GLOBAL>::24::29::141",
    "target": "patent.py::fibonacci((n))::<GLOBAL>::3::11::186"
  },
  {
    "added_by": "c66c28d398bbbc3a84fb8ce127476b55902b4aa2",
    "weight": null,
    "source": "patent.py::main()::<GLOBAL>::24::29::141",
    "target": "patent.py::bubble_sort_and_reverse((arr))::<GLOBAL>::15::21::214"
  },
  {
    "added_by": "ff6f447c7d8a0a97d0ea472b4ca6b3f5edc59d93",
    "weight": null,
    "source": "patent.py::main()::<GLOBAL>::24::29::141",
    "target": "patent.py::reverse_array((arr))::<GLOBAL>::25::26::44"
  },
  {
    "added_by": "c66c28d398bbbc3a84fb8ce127476b55902b4aa2",
    "weight": null,
    "source": "patent.py::main()::<GLOBAL>::24::29::141",
    "target": "patent.py::fibonacci_plus_one((n))::<GLOBAL>::3::11::213"
  },
  {
    "added_by": "c66c28d398bbbc3a84fb8ce127476b55902b4aa2",
    "weight": null,
    "source": "patent.py::fibonacci_plus_one((n))::<GLOBAL>::3::11::213",
    "target": "patent.py::fibonacci_plus_one((n))::<GLOBAL>::3::11::213"
  }
 ]
}
```

*FIG. 6-2*

SYSTEMS AND METHODS FOR EVALUATING CODE CONTRIBUTIONS BY SOFTWARE DEVELOPERS

CROSS-REFERENCE TO RELATED APPLICATIONS

This application is a U.S. National Stage Application of International Application No. PCT/CN2019/115270 filed Nov. 4, 2019, which designates the United States of America, the contents of which are hereby incorporated by reference in their entirety.

TECHNICAL FIELD

The present disclosure relates to microcontrollers, and more particularly, to systems and methods for evaluating the respective code contributions to a software project by different software developers.

BACKGROUND

In a typical software development environment, developers contribute code to a software project repository. The code contributions of each developer are typically characterized by simple metrics, such as the number of commits (NOC) or lines of code (LOC) attributable to each developer. For example, GitHub uses the NOC to rank the developers of a software project. As another example, Expertise Browser, a classic tool for identifying developer expertise, uses the number of changed LOCs as an indicator of each developer's contribution. Such metrics measure the amount of code contributions by each developer, rather than the value of the code contributions. For example, a function at the core of the application logic is typically more valuable than an auxiliary script, but conventional code contribution metrics fail to capture this distinction.

In many situations it is useful to recognize and compare the value of different developers' contributions, beyond the conventional quantity-based metrics. While traditional value-based software engineering often focuses on creating economic value as a way to prioritize resource allocation and scheduling, other measurements of value are more relevant in some situations. For example, a programming instructor may want to evaluate individual students' code contributions to group projects (apart from non-code contributions), despite such code contributions being generally unrelated to economic returns. As another example, an engineering manager may have a need to perform quantitative measurement of the respective performance of individual team members. In addition, software engineering researchers typically observe development activities per se, but not necessarily their economic returns. As yet another example, for free and open-source software (FOSS) projects, the contributions of different developers heavily influence collaboration, coordination, and leadership aspects of the relevant project.

Thus, an object exists to provide tools for analyzing code contributions of software developers that capture the intrinsic value of the code contributions, e.g., the effect on development activities of contributed code, beyond simply counting lines of code or commits, for example to more effective evaluate and/or rank individual developers and to improve the understanding of software development processes.

SUMMARY

In general and in one aspect, a system is provided for evaluating code contributions to a software project by each of a plurality of software developers, which considers both the structural value and non-structural value of each developer's contributions. The system may include at least one memory device and at least one processor communicatively coupled to the memory device(s). The memory device(s) may store a code repository including a collection of code, the collection of code including a portion of code, including a plurality of functions, developed by each of the plurality of software developers. The memory device(s) may also store a list of defined code impact categories for classifying commits according to their impact.

The processor(s) may be configured to access the collection of code from the code repository, and parse the collection of code to generate abstract syntax trees (ASTs) representing the collection of code, or portions thereof, at multiple different times during the software project. The processor(s) may perform both a structural value analysis and a non-structural value analysis of the code contributions of each software developer. The structural value analysis for each software developer may include (a) generating at least one call-commit graph from the ASTs, (b) performing a call-commit analysis of the at least one call-commit graph to analyze function calls and commits attributable to each software developer, and (c) calculating a structural value score for each software developer based at least on the call-commit analysis. The non-structural value analysis for each software developer may include (a) analyzing the ASTs to identify commits attributable to each software developer, (b) performing a commit classification to classify each identified commit based on the list of defined code impact categories, and (c) calculating a non-structural code impact score for each software developer based at least on the commit classification for commits attributable to that software developer.

The processor(s) may then calculate a development value score for each software developer based at least on (a) the structural value score for each software developer and (b) the non-structural code impact score for each software developer. The processor(s) may display a representation of the development value score calculated for each software developer, e.g., by generating charts, graphs, or other displayable visuals.

One basic aspect of the invention is providing systems and methods that automatically quantify the value of developers' code contributions to a project based on a combination of (a) a structural value of each developer's code contributions, e.g., structural effects of each developers' code, and (b) a non-structural value of each developer's code contributions, e.g., the impact of each developers' code on the development of the software project. Both components are calculated and combined to calculate an overall development value for each developer. The inventors have discovered that evaluation of software developers according to the present invention provides better and more useful results than those obtained by human assessment or by simple conventional counting methods, such as simply counting lines of code or commits for example.

In another aspect, a method is provided for evaluating code contributions by each of a plurality of software developers, which considers both the structural value and non-structural value of each developer's contributions. A code repository may store a collection of code including a portion of code, including a plurality of functions, developed by each of the plurality of software developers. A list of defined code impact categories for classifying commits according to their impact may also be stored. The collection of code may be accessed from the code repository and parsed to generate abstract syntax trees (ASTs) representing the collection of code, or portions thereof, at multiple different times during the software project.

Both a structural value analysis and a non-structural value analysis of the code contributions of each software developer may be performed based on the ATSs. The structural value analysis for each software developer may include generating at least one call-commit graph from the ASTs, performing a call-commit analysis of the at least one call-commit graph to analyze function calls and commits attributable to each software developer, and calculating a structural value score for each software developer based at least on the call-commit analysis. The non-structural value analysis for each software developer may include analyzing the ASTs to identify commits attributable to each software developer, performing a commit classification to classify each identified commit based on the list of defined code impact categories, and calculating a non-structural code impact score for each software developer based at least on the commit classification for commits attributable to that software developer. A development value score may be calculated for each software developer based on a plurality of development value score inputs including (a) the structural value score for each software developer and (b) the non-structural code impact score for each software developer. A representation of the development value score calculated for each software developer may then be displayed or otherwise output.

BRIEF DESCRIPTION OF THE FIGURES

The present invention will be readily understood by the following detailed description in conjunction with the accompanying drawings, wherein like reference numerals designate like structural elements.

FIG. 3 represents an example file with two code commits;

FIGS. 4 and 5 represent abstract syntax trees (ASTs) for the two commits in the example file shown in FIG. 3;

FIG. 6-1 and FIG. 6-2 represent an example call-commit graph generated from the ASTs shown in FIGS. 4 and 5;

DETAILED DESCRIPTION

Figure 1:
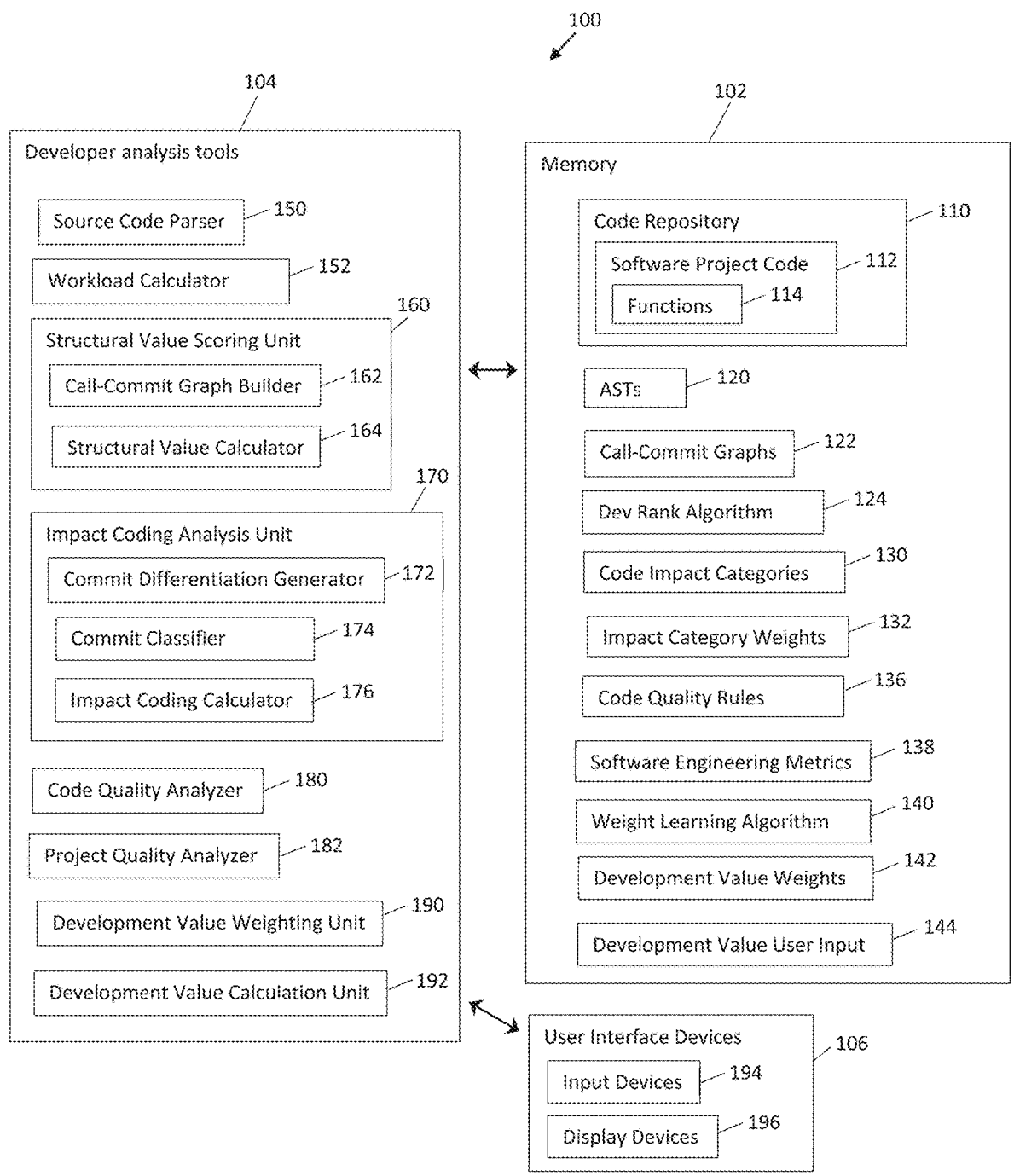
FIG. 1 is a diagram of an example system for evaluating code contributions of software developers, which considers both the structural value and non-structural value of each developer's contributions, in accordance with embodiments of the present invention.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

An object exists to provide tools for analyzing code contributions of software developers that capture the intrinsic value of the code contributions, e.g., the effect on development activities of contributed code, beyond simply counting lines of code or commits, for example to more effective evaluate and/or rank individual developers and to improve the understanding of software development processes. Thus, the present invention provides systems and methods that evaluate code contributions of software developers based on a combination of (a) a structural value of each developer's code contributions, e.g., structural effects of each developers' code, and (b) a non-structural value of each developer's code contributions, e.g., the impact of each developers' code on the development of the software project. The inventors have discovered that such evaluations of software developers provide better and more useful results than those obtained using conventional evaluation techniques.

In one aspect, a system is provided for evaluating code contributions to a software project by each of a plurality of software developers, which considers both the structural value and non-structural value of each developer's contributions. For example, the system may calculate a development value score for each developer that combines (a) at least one structural value score representing the structural value of code contributions of the respective developer and (b) at least one non-structural value score representing the non-structural value of code contributions of the respective developer.

The system may include memory device(s) and processor(s) connected to the memory device(s). The memory device(s) may store a code repository including a collection of source code for the software project, which includes portions of code developed by each of the different developers. The portion of code attributed to each developer may include various pieces of code, referred to as functions. Each function attributed to each developer may have dependencies or other relationships with other functions attributed to the same developer or other developer(s).

In some embodiments, the memory device(s) may also store algorithms, rules, and/or other data for evaluating the code contributions of each developer, as disclosed herein. For example, in some embodiments, memory device(s) may store a list of defined code impact categories for classifying and scoring the commits attributable to each developer according to the impact of such commits, as explained below.

As another example, memory device(s) may store rules and/or weights for evaluating the structural value of the code attributable to each developer, e.g., by evaluating the relationships between and among functions and commits attributable to each developer, as discussed below.

As another example, memory device(s) may store a set of code quality rules for evaluating the quality of the code attributable to each developer.

As another example, memory device(s) may store an algorithm and/or set of weights for calculating the development value score for each developer, including for example, weights for each structural value score representing the structural value of code contributions of the respective developer and weights for each non-structural value score representing the non-structural value of code contributions of the respective developer.

In some embodiments, the system may store and utilize each of the various types of data listed above. In other embodiments, the system may store and utilize only some of the data listed above. For example, the system may store and utilize a list of defined code impact categories for classifying the commits attributable to each developer, and a set of code quality rules for evaluating the quality of the code attributable to each developer, but may not store or utilize weights for calculating the development value score for each developer.

The system may include a source code parser configured to access the software project source code from the code repository, and transform the source code into a set of abstract syntax trees (ASTs) representing the code, or portions thereof, at multiple different times during the software project. Each AST comprises a tree structure representing the logic of the respective code. The parser may comprise or utilize any suitable tools and techniques known in the art for generating ASTs from source code. Typically, different programming languages, e.g., C++, Javascript, etc., have different AST expressions. Thus, in some embodiments the parser is configured to generate a universal, language-independent ASTs representing an abstracted version of multiple language-specific ASTs.

The system may further include both (a) structural value analysis tools for analyzing and scoring structural aspects of the code contributions of each developer, and (b) non-structural value analysis tools for analyzing and scoring non-structural aspects of the code contributions of each developer. In some embodiments, both the structural value analysis tools and non-structural value analysis tools may perform their respective analyses and scoring based on the ASTs generated by the parser.

In some embodiments, the structural value analysis tools may include either one or both of (a) a workload calculator configured to calculate a development equivalent score representing an amount of work or effort attributed to each developer, based on the code attributed to that developer, and (b) a structural value scoring unit configured to calculate a structural value score for each developer.

The workload calculator may be configured to measure the effort of coding as reflected by the ASTs. In one embodiment, the workload calculator is configured to count the number of logic operations expressed or performed by the code attributable to each developer, and calculate a development equivalent score for the respective developer based on the number of logic operations. The number of logic operations expressed by the code represents a complexity of the code developed by the respective developer, and thus the amount of effort by that developer. The development equivalent score is generally analogous to counting lines of code (LOC), but provides a more accurate and useful measure of the amount of work performed by each developer. For example, LOC is often arbitrary (e.g., due to the number of returns or other formatting-type details in the code) and can also be gamed by developers. In contrast, the development equivalent score calculated by the development equivalent score may avoid such issues common to LOC and other conventional work estimation techniques.

The structural value scoring unit may be configured to calculate a structural value score for each developer. The structural value scoring unit may be configured to generate "call-commit" graphs for each developer from relevant ASTs, perform a call-commit analysis of such call-commit graphs to analyze function calls and commits attributable to each developer, and calculate a structural value score for each software developer based at least on the call-commit analysis.

In one embodiment, the structural value scoring unit includes a graph builder configured to generate call-commit graph from selected ASTs. A call-commit graph may include two types of nodes: (1) function nodes representing functions (pieces of code) and (2) commit nodes representing code commits. Each commit in the code may either introduce a new function, or make changes to an existing function. The call-commit graph may also define two types of node relationships between the various nodes: (1) function call relationships between function nodes (pieces of code), wherein one function calls another function (or multiple other functions) to implement some functionality, and (2) commit change relationships between commit nodes and function nodes, representing a commit that changed an existing function; each such relationship may be defined by an edge from the respective commit node to the function node of the function changed by the respective commit.

The structural value scoring unit may also include a structural value calculator configured to calculate structural value scores for each developer based on the nodes and/or node relationships in the call-commit graph(s) generated by the graph builder. In one embodiment, the structural value calculator includes a development rank algorithm configured to calculate structural value scores, also referred to herein as "development rank" scores in a manner similar to a known page rank algorithm. The algorithm assumes a visit to a call-commit graph by a visitor, and applies rules to the visitors behavior. The algorithm calculates the probability of the visitor landing at each node (including function nodes and commit nodes), which represents an importance of the node. The algorithm thus assigns a structural value to each node defined by or based on the determined probability of landing at that node. The algorithm then sums up the structural values for all nodes in the graph that are attributed to each developer, to thereby calculate a structural value score for the respective developer. In another embodiment, the algorithm sums up the structural values only for commit nodes attributed to each developer to calculate the structural value score for the respective developer.

As noted above, in addition to the example structural value analysis tools discussed above, the system includes non-structural value analysis tools for analyzing and scoring non-structural aspects of the code contributions of each developer. In some embodiments, the non-structural value analysis tools may include any one, two, or all three of (a) an impact coding analysis unit configured to categorize and score the commits attributed to each developer, based on the type of the developer's commits, (b) a code quality analyzer configured to calculate a code quality score representing the quality of the code attributed to each developer, and/or (c) a project quality analyzer configured to calculate a project quality score for each developer based on a set of software engineering metrics.

The impact coding analysis unit is configured to categorize and score commits in the code. Each commit in the code, including commits that create a new function and commits that change an existing function, which changes the code base, which is translated into ASTs. Each code commit results in two AST versions, one before the commit and one after the commit. The impact coding analysis unit may include a commit differentiation generator configured to compare AST versions to identify differences, which represent code commits. The commit differentiation generator may be configured to identify code commits attributable to each developer.

The impact coding analysis unit may also include a commit classifier configured to classify each commit attributed to each developer based on the list of defined code impact categories. The code impact categories may define code categories generally having a different level of impact on the software project. For example, the code impact categories may include the following categories: (a) feature commit, (b) improvement commit, (c) bug fix commit, and (d) maintenance commit.

The impact coding analysis unit may also include an impact coding calculator configured to calculate an impact coding score for each developer based on the classified categories of commits attributed to that developer. The impact coding calculator may apply a weighted score to each commit category and sum the weighted score of all commits attributed to each developer, to calculate the impact coding score for each developer. The weighted score for each commit category may represent the typical level of impact of that type of commit on a software project.

The code quality analyzer may be configured to calculate a code quality score representing the quality of the code attributed to each developer. The code quality analysis unit may calculate the code quality score for each respective developer based on a set of defined code quality rules applied to the code attributed to the developer. Code quality rules may include any rules defining a quality of code. One example code quality rule checks whether each variable that is defined in the code is actually used in the code. Another example code quality rule checks whether each piece of code that opens a file (e.g., to read certain data) has a corresponding piece of code that subsequently closes the file, e.g., to release processing resources. In one embodiment, the code quality analyzer is configured to identify and count a number of code quality rule violations by each developer, and score each developer based on the number of violations.

The project quality analyzer may be configured to calculate a project quality score for each developer based on a set of defined software engineering metrics. For example, the project quality analyzer may determine and quantify the extent to which the commits attributed to each developer affect each software engineering metric, and calculate a score for each developer based on their effects on the full set of software engineering metrics. In some embodiment, the project quality analyzer may analyze the source code itself (by applying the software engineering metrics to the source code), or may analyze ASTs representing the source code, or may analyze both the source code and the ASTs, to determine the effects of each developer's code contributions on each respective software engineering metric. The set of defined software engineering metrics may include any quantifiable metrics for analyzing the code attributed to each developer.

Example software engineering metrics may include:
Modularity: represents how easily the code can be divided into cohesive, decoupled components. The metric is calculated as the modularity score of the best partition of the call-commit graph of the code.
Document coverage: indicates the percentage of functions that have formatted comments.
Velocity: indicates how fast the development team has been moving in the last defined time period (e.g., the last month). The metric is calculated as the slope of a development value curve over the last defined time period (e.g., the last month).
Test coverage: indicates the percentage of functions that are covered by test cases.
Robustness: indicates the percentage of developers having a lower development value than the average of the developers being analyzed.
Dryness: indicates the percentage of code that is not duplicated.

The system may also include a development value calculation unit configured to calculate a development value score for each developer based on (a) the scores output by the structural value analysis tools and (b) the scores output by the non-structural value analysis tools for the respective developer. For example, in one embodiment, the development value calculation unit may calculate the development value score for each developer based on any combination of the following development value score inputs: (a) the development equivalent score for the developer calculated by the workload calculator (structural value input), (b) the structural value score calculated by the structural value scoring unit (structural value input), (c) the impact coding score for the developer developed by the impact coding analysis unit (non-structural value input), and (d) the code quality score for the developer calculated by the code quality analysis unit.

In some embodiments, the system also includes a development value weighting unit configured to sore and/or dynamically adjust weights for the various development value score inputs used to calculate the development value score for each respective developer. The development value weighting unit may include a weight learning unit configured to implement a learning-to-rank algorithm to dynamically determine and adjust the weights for the different development value score inputs over time, e.g., based on user input indicating comparisons or rankings of commits in the code.

As structural and non-structural analyses capture two fundamental aspects of development value, the development value weighting unit combines the two to calculate an overall development value. Suppose a commit has structural value d and non-structural value t. In some embodiments, a goal is to find a function p that combines the two: $v=\varphi(d, t)$. d may represent each structural score or a combination of structural scores (e.g., development equivalent scores and/or structural value scores), while t may represent each non-structural score or a combination of non-structural scores (e.g., code impact scores, code quality scores, and/or project quality scores).

If a reliable ground truth was available—that is, a large set of commits with known overall development value—the task could be posed as an optimization problem: from the data set, determine the weight vector w in $$\varphi(d, t) = w^T \begin{bmatrix} d \\ t \end{bmatrix}$$

so that the average error between the true value and p (d, t) of every commit is minimized.

Unfortunately, developers find it very difficult to directly score code values in a free-form manner, e.g., giving one commit 0.17 and another 0.06, so it is difficult to obtain reliable ground truth in that form. Thus, in one embodiment, developers are asked to compare commit pairs of the same develop and identify which of each pair is more valuable, and such human input is used for weight learning. This technique helps eliminate the influence of personal interests and interpersonal relationships. Based on this "pairwise ground truth," a learning to rank (L2R) algorithm may be used to determine $\varphi$. The example algorithm uses d and t as the input features to a Ranking SVM. After training, the weight vector of the SVM is taken as w in $\varphi$(d, t). This method allows the structural and non-structural value scores for each commit to be combined, to thereby determine an overall development value score for each developer.

After calculating the development value score for each developer, the system may display or otherwise output a representation of the development value scores, e.g., by generating charts, graphs, or other visuals for display on any suitable display device.

Each component of the system described above, including at least the source code parser, workload calculator, structural value scoring unit, call-commit graph builder, structural value calculator, impact coding analysis unit, commit differentiation generator, commit classifier, impact coding calculator, code quality analysis unit, code quality checker, development value calculation unit, and development value weighting unit, includes or has access to any suitable hardware, software, and/or firmware elements for performing the functions of the respective system component. In some embodiments, one, some, or all of the system components are embodied in software stored in memory and executable by one or more processors to perform the functions of the respective system component(s).

FIG. 1 shows an example system 100 for evaluating code contributions to a software project by each of a plurality of software developers, which considers both the structural value and non-structural value of each developer's contributions, according to one example embodiment of the invention. Example system 100 includes memory 102, developer analysis tools 104, and user interfaces 106. Memory 102 may be embodied by one or more data storage devices, for example, any one or combination of hard drives, RAM, ROM, EEPROM, Flash memory, removable memory device (e.g., USB drives), etc. Memory 102 may store a code repository 110 storing source code 112 for a software project, which includes a collection of functions 114, i.e., pieces of code, developed by multiple different software developers. Memory 102 may also store a set of abstract syntax trees (ASTs) 120 representing the source code, or portions thereof, at multiple different times during the software project. Memory 102 may also store a set of call-commit graphs 122 including and defining relationships between function nodes and code commit nodes, as discussed herein.

Memory 102 may also store a development rank algorithm 124 for calculating a structural value score for each developer. The development rank algorithm 124 may be configured to calculate the probability of the visitor landing at each node in a call-commit graph 122, and calculate a score for each developer by summing the probabilities corresponding to code developed by the respective developer.

Memory 102 may also store a list or set of code impact categories 130 for classifying code commits, and a set of impact category weights 132 for respective code impact categories 130, wherein the weights 132 may indicate the importance or impact of each category 130 of commit on the software project.

Memory 102 may also store a set of code quality rules 136 and software engineering metrics 138 for analyzing the quality of code contributed by each developer. Finally, memory 102 may also store a development value weight learning algorithm 140 configured to dynamically determine and/or adjust a set of weights 142 for weighting the various inputs into an overall development value score for each developer, and may also store development value user input 144 used by the weight learning algorithm 140 for adjusting the weights 142. Development value user input 144 may include, for example, human input regarding the relative value of different commits or different types of commits in the code being analyzed.

Developer analysis tools 104 include any suitable tools for analyzing the source project code 112 to calculate a development value score for each developer, representing the value of the code contributions of each respective developer. Developer analysis tools 104 are configured to access, utilize, and store any relevant data and/or algorithms in memory 102. In this example embodiment, developer analysis tools 104 include a source code parser 150, a workload calculator 152, a structural value scoring unit 160, an impact coding analysis unit 170, a code quality checker 180, a project quality checker 182, a development value weighting unit 190, and a development value calculation unit 192. Structural value scoring unit 160 may include a call-commit graph builder 162 and a structural value calculator 164. impact coding analysis unit 170 may include a commit differentiation generator 172, a commit classifier 174, and an impact coding calculator 176. The functional operation of each of the developer analysis tools 104 shown in FIG. 1 is described in detail with reference to the process flow shown in FIG. 2, discussed below.

User interfaces 106 may include one or more user input devices 194 and one or more display devices 196. Input device(s) 194 may include any device(s) configured to allow a user to interface with developer analysis tools 104, for example, at least one keyboard, keypad, mouse, touchpad, touchscreen, voice-based input device, etc. Display device(s) 196 may include any device(s) for displaying information generated by or related to system 100, for example, at least one monitor, touchscreen or other display screen, etc.

Figure 2:
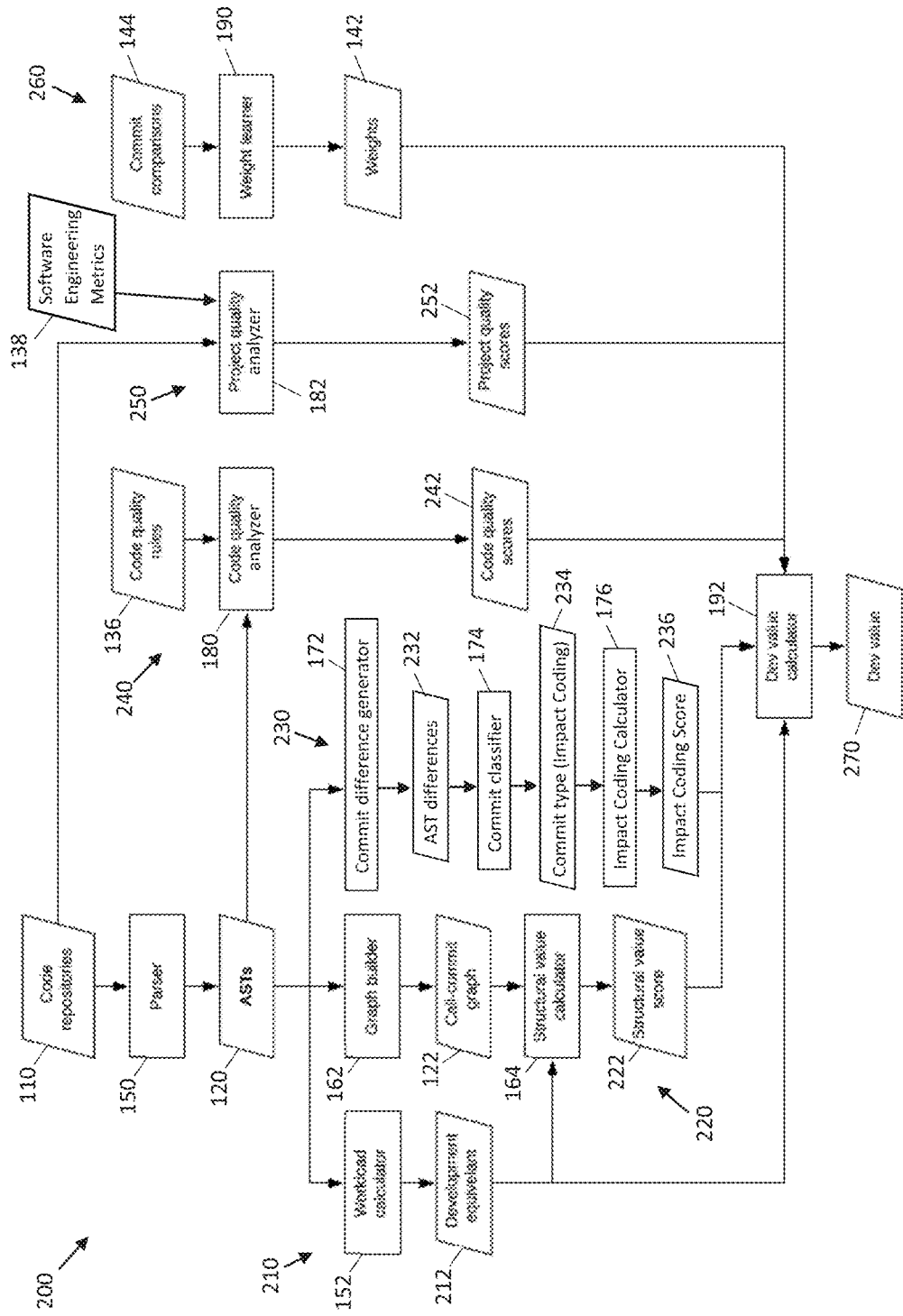
FIG. 2 illustrates an example method performed by the system shown in FIG. 1 for evaluating code contributions to a software project by each of a plurality of software developers, according to one example embodiment of the invention.

FIG. 2 illustrates an example method 200 for evaluating code contributions to a software project by each of a plurality of software developers, which considers both the structural value and non-structural value of each developer's contributions, according to one example embodiment of the invention. Example method 200 may be executed by example system 100 shown in FIG. 1. Thus, method 200 illustrates the operational relationships of the various components of system 100.

First, source code parser 150 may access source code 112 of the software project from code repository 110, and transform the source code into a set of ASTs 120 representing the code, or portions thereof, at multiple different times during the software project. Each AST comprises a tree structure representing the logic of the respective code. The parser 150 may generate language-independent ASTs representing an abstracted version of multiple language-specific AST formats.

The system may perform various different analyses based on the generated ASTs 120. The various analyses may be performed in any order, or fully or partially simultaneously. As indicated at 210, a structural workload analysis may be performed for analyze the amount of work or effort expended by respective developer. In this example, the workload calculator 152 may count the number of logic operations expressed or performed by the code attributable to each developer, and calculate a development equivalent score 212 for the developer based on the counted number of logic operations.

As indicated at 220, a structural value analysis of functions (pieces of code) and commits attributable to each develop may be performed to calculate a structural value score for each developer. The graph builder 162 may generate call-commit graphs 122 from selected ASTs 120. As discussed above, each call-commit graph 122 may include two types of nodes: (1) function nodes representing functions (pieces of code) and (2) commit nodes representing code commits, and may define two types of node relationships: (1) function call relationships between function nodes, and (2) commit change relationships between commit nodes and function nodes.

An example is provided in the figures to illustrate some of the concepts discussed above.

First, FIG. 3 represents an example file "patent.py" with two commits 310 and 320. In the first commit, patent.py has four functions: "fibonacci", "bubble sort", "reverse array", and "main." In the second commit, "fibonacci" and "bubble sort" are both renamed and modified; "reverse array" is completely removed; "main" is modified so that it no longer calls "reverse array".

Figure 5:
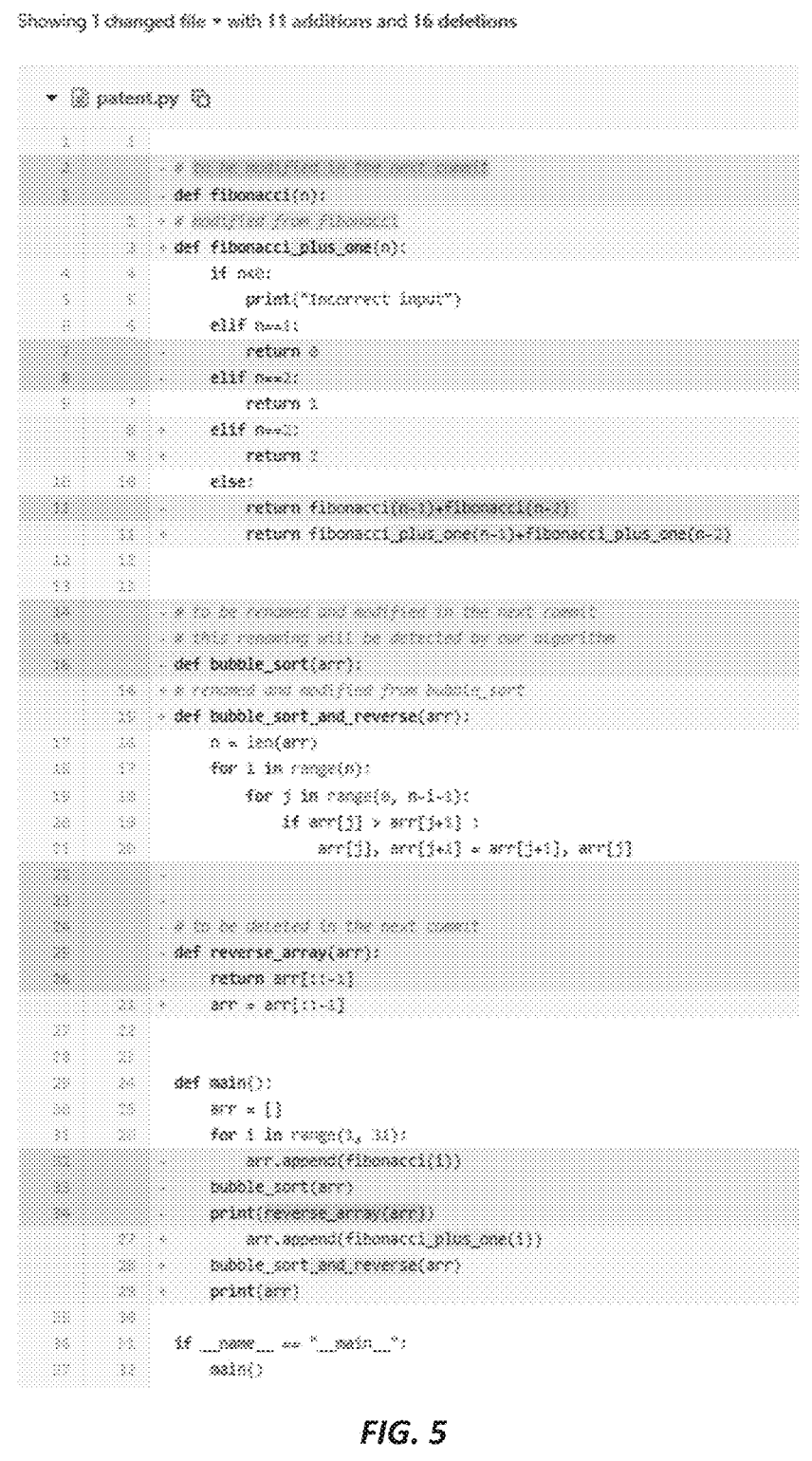

Next, FIGS. 4 and 5 represent ASTs for the two example commits 310 and 320, respectively, in patent.py shown in FIG. 3. In the ASTs, "term" specifies the type of a node; "lhs"/"rhs" refers to left/right-hand side.

Finally, FIG. 6-1 and FIG. 6-2 represent an example call-commit graph 500 generated from the ASTs shown in FIGS. 4 and 5. The call-commit graph 500 consists of "commits", "nodes" which are functions, and "links" between nodes. Each commit can be denoted by its "id" like "ff6f447c7d8a0a97d0ea472b4ca6b3f5edc59d93". Each node can be denoted by the function path, name and location, like "patent.py::fibonacci((n)::<GLOBAL>::3::11::186"; it also contains a "history" of all commits that modify the function.

Returning to FIG. 1 for reference, the structural value calculator 164 may calculate structural value scores 222 for each developer based on the nodes and/or node relationships in the call-commit graphs 112. For example, the structural value calculator 164 may execute a development rank algorithm 124 to calculate the structural value scores 222, in a manner analogous to a known page rank algorithm. In general, the algorithm 124 assumes a visit to a call-commit graph by a visitor, and applies rules to the visitors behavior. The algorithm calculates the probability of the visitor landing at each node (including function nodes and commit nodes), which represents an importance of the node. The algorithm thus assigns a structural value to each node defined by or based on the determined probability of landing at that node. The algorithm then sums up the structural values for all nodes in the graph that are attributed to each developer, to thereby calculate a structural value score 222 for the respective developer.

A specific example of the development rank algorithm 124 is explained as follows. In most imperative programming languages, a function (procedure, method) is a basic unit of the program structure. The development value of a function is based not only on the effort spent creating the function, but also on the effort saved when other code calls the function. The structural component of the development value (structural value) is captured by the example development rank algorithm, referred to herein as the "DevRank algorithm" which is an extension of the original PageRank algorithm known in the art.

PageRank is the basis for Google Web Search and finds applications in various domains. The algorithm runs over a directed graph of web pages. It hypothesizes a web surfer with an assumed visiting behavior and iteratively calculates the probability that the surfer visits each page. The meaning of the calculated probabilities depends on the behavior of the surfer. In the original PageRank, the surfer engages in two random actions: (1) upon arriving at a page, with probability a, the surfer randomly selects a link on that page and visits the linked page; and (2) with probability $1-\alpha$, the surfer teleports to a random page and continues. The damping factor $\alpha$ is a fixed probability chosen in advance. Based on the behavior, the resulting probability reflects how likely a page is to be visited according to the link structure of pages. Intuitively, what is reflected is the popularity or importance of a page on the web.

To compute each function's structural value, the example DevRank algorithm constructs a static function-call graph of the code. Although program execution never randomly jumps to an irrelevant function as in PageRank, the present inventors have found that PageRank is a surprisingly convenient model for characterizing code development. Thus, the inventors interpret random teleportation as navigating the development activities of the code, rather than execution behavior.

In the DevRank algorithm, the hypothetical "surfer" becomes a development sniffer, whose task is to detect development effort. The algorithm assumes that the development effort spent on a function is revealed by the total LOCs of all changes that result in the function across the development history. The inventors believe this technique more precisely quantifies the development effort than counting the LOCs at the latest snapshot. Based on this assumption, the behavior of the sniffer is constructed in the following way: (1) Upon arriving at a function, with probability a, the sniffer visits one of the called functions with probability proportional to the development efforts of those functions. As the inventors regard calling a function as a way to save development effort on the part of the caller, this behavior reflects how much development effort is saved by coding a call to each function. (2) With probability $1-\alpha$, the sniffer teleports to a random function with a probability proportional to the development effort of the function. Such teleportation can be explained as the sniffer's search for development effort. Overall, it can be seen that the resulting probability of the sniffer showing up on each function reflects the development effort spent on the function and that the function saves other developers. Therefore, it reflects the development value of a function.

After computing DevRank scores 222 for functions, the structural value calculator 164 can distribute development values of functions to commits, and further to developers, to thereby calculate a structural value score 222 for each developer. This may be done by allocating the value of a function to all commits that change the function, proportional to the size of their changes (i.e., the number of changed LOCs), and then assigning the value of commits to their corresponding authors. In this way, developers receive credits for their contributions.

The workload analysis 210 and structural value analysis 220 represent structural analyses of the code contributions of the different developers. In addition to these structural analyses, method 200 may include the following non-structural analyses of the developers' respective contributions to the project: (a) an impact coding analysis 230, (b) a code quality analysis 240, and (c) a project quality analysis 250.

For the impact coding analysis 230, an impact coding analysis unit 170 may categorize and score commits attributed to each developer, e.g., based on the types of each developer's commits, as different types of commits generally have different levels of importance or impact on the project. The commit differentiation generator 172 of the impact coding analysis unit 170 may compare different AST versions representing snapshots of the code at different times to identify differences 232 in the AST versions, to thereby identify code commits attributable to each developer. The commit classifier 174 may then classify each commit attributed to each developer based on the list of defined code impact categories 130, e.g., feature, improvement, bug fix, or maintenance commit.

The impact coding calculator 176 may then calculate an impact coding score 236 for each developer based on the classified categories of commits attributed to that developer. The impact coding calculator may apply code impact category weights 132 to each commit based on the commit category and sum the weighted score of all commits attributed to each developer, to calculate the impact coding score 236 for each developer. The weight 132 for each commit category may represent the typical level of impact of that type of commit on a software project.

For the code quality analysis 240, the code quality analyzer 180 may be configured to calculate a code quality score representing the quality of the code attributed to each developer, by applying a set of code quality rules 136 to the code attributed to the developer. In one embodiment, the code quality analyzer 180 may identify and count a number of violations of each code quality rule 136 by the respective developer, and score the developer based on the total number of violations.

For the code quality analysis 250, the project quality analyzer 182 may be configured to calculate a project quality score 252 for each developer based on a set of defined software engineering metrics 138 applied to the code attributed to the respective developer. The project quality analyzer 182 may apply the software engineering metrics 138 directly to the project source code 112, instead of analyzing ASTs 120.

A development value score 270 for each developer may be calculated based on the various development value score inputs calculated as described above, including one, some or all of the following (a) development equivalent scores 212 (structural), structural value scores 222 (structural), impact coding scores 232 (non-structural), code quality scores 242 (non-structural), and project quality scores 252 (non-structural).

In some embodiments, e.g., as shown in method 200, a score input weighting may be performed at 260. For example, the development value weighting unit 190 may execute a weight learning algorithm 140, based at least on user input 144, to determine and dynamically adjust a set of weights 142 for the various development value score inputs (e.g., respective weights for the scores 212, 222, 232, 242, and 252). The user input 144 may include human input indicating comparisons or rankings of commits or types of commits in the code, over time.

The development value calculation unit 192 may then calculate a development value score 270 for each developer based on the development value score inputs (e.g., scores 212, 222, 232, 242, and 252) and the score input weights 142 determined at 260. Thus, the development value score 270 for each developer considers both structural and non-structural aspects of the contributions provided by that developer, and thus provides various advantages over conventional developer analysis techniques.

After calculating the development value score 270 for each developer, system 100 may display or otherwise output a representation of the development value scores, e.g., by generating charts, graphs, or other visuals for display on any suitable display device 196.

Figure 7:
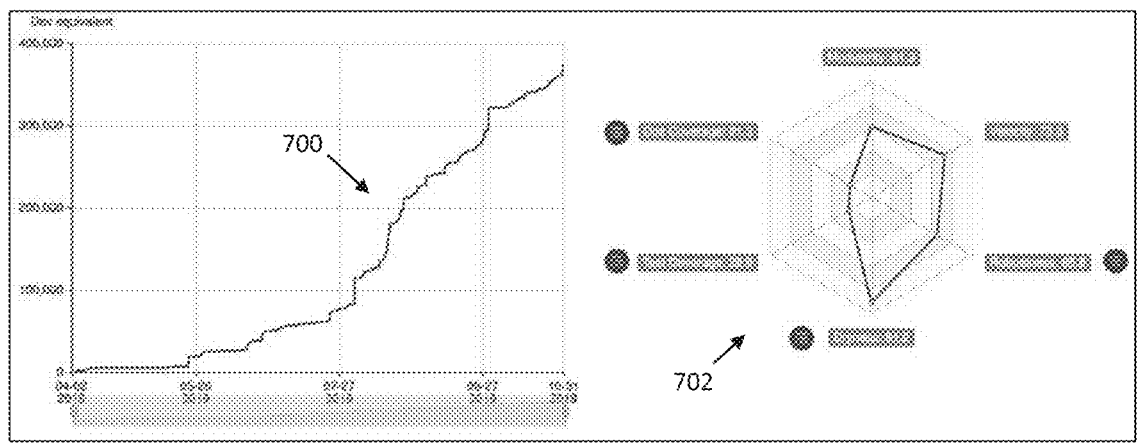
FIG. 7 shows an example displayable view including an example development history graph indicating the development progress of a software project over time, according to one embodiment of the invention.

FIGS. 7-10C show example graphics and views that may be generated by system 100 and displayed on any suitable display device 196. FIG. 7 shows an example view including (a) an example development history graph 700 indicating the development progress of the software project over time, and (b) an example spider graph (or radar chart) 702 indicating measurements of six example software engineering metrics 138 applied to the software project code. The project quality analyzer 182 may generate a spider graph 702 for each different developer indicating, for example, the effect of that developer's commits on the overall project code. In one embodiment, the project quality analyzer 182 allows a user to select (e.g., click on) each software engineering metric 138 in the spider graph 702 for a particular developer, and automatically displays recommendations for improving the developer's code related to the selected metric 138. For example, a user may click on the "dryness" metric in the spider graph 702, and the project quality analyzer 182 may automatically display instances of repetitive or redundant pieces of code that effect the dryness metric.

Figure 8:
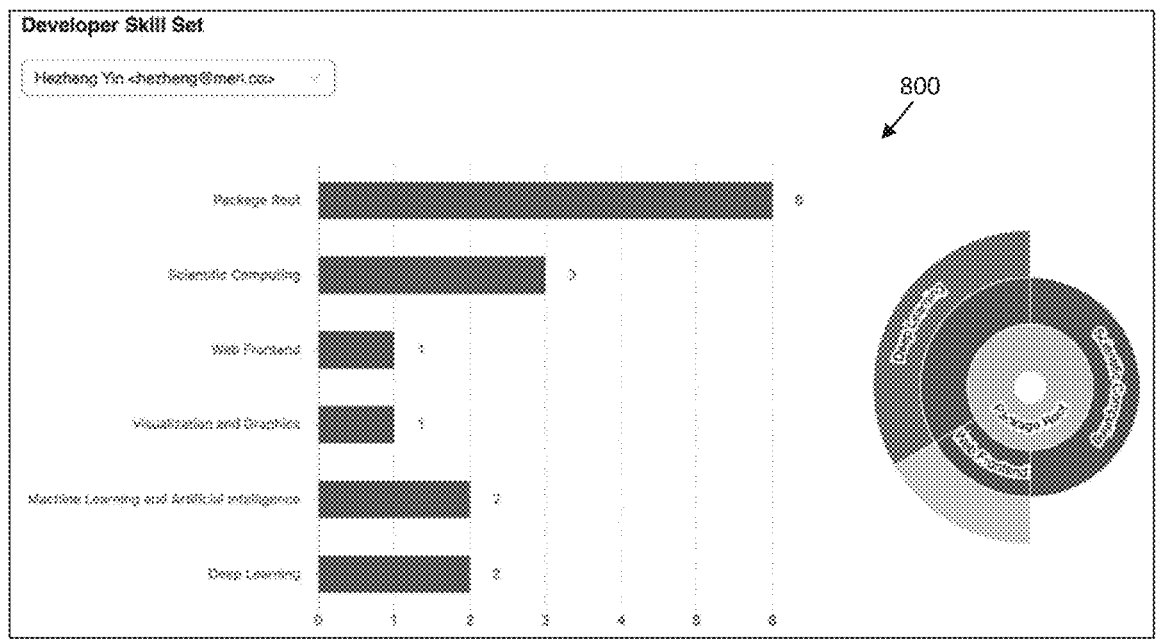
FIG. 8 shows an example displayable view of a developer skill set graphic indicating a skill set for each respective developer, according to one embodiment of the invention.

FIG. 8 shows an example view of a developer skill set graphic 800 generated by system 100. The system may categorize the project code into different technical categories based on a defined set of tags added by the developers as they write code, and determine a skill level in each technical category for each developer based on the amount of code by that developer tagged with the respective technical category tag. The graphic 800 may display the various skill levels for a selected developer in any suitable manner, as shown.

Figure 9:
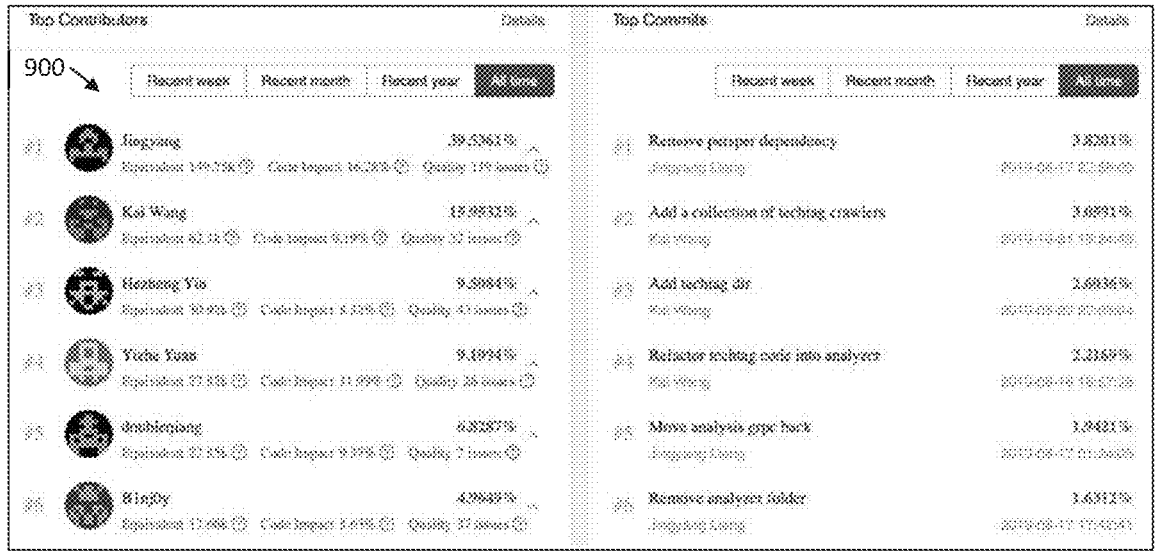
FIG. 9 shows an example displayable view of a development value score graphic indicating a development value score and components thereof, for selected developers, according to one embodiment of the invention.

FIG. 9 shows an example view of a development value score graphic 900 generated by system 100. The development value score graphic 900 may display the development value score 270 and/or selected components thereof, for selected developers. In the illustrated example, the development value score graphic 900 shows the developers having the highest development value scores 270, as well as the following component scores: development equivalent score 212, impact coding score 236, and code quality score 242.

Figure 10A:
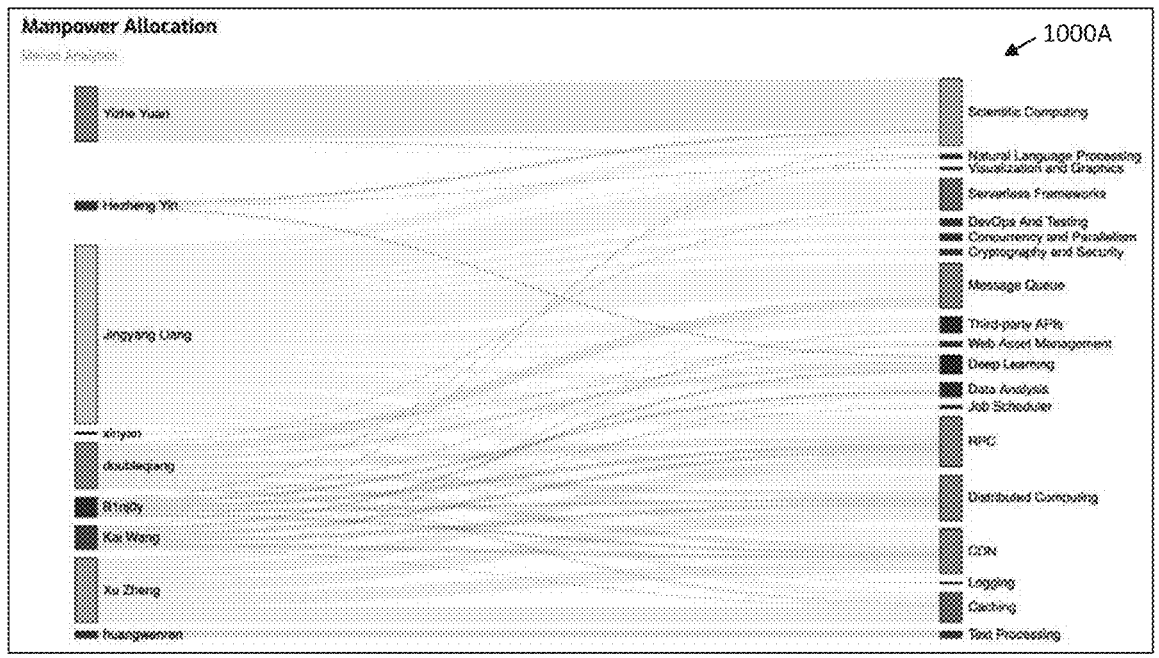
FIGS. 10A-10C shows an example displayable views of example manpower allocation graphics providing a visual indication of the relationships between developers and technical categories (or tasks) associated with a software project, according to one embodiment of the invention.
Figure 10B:
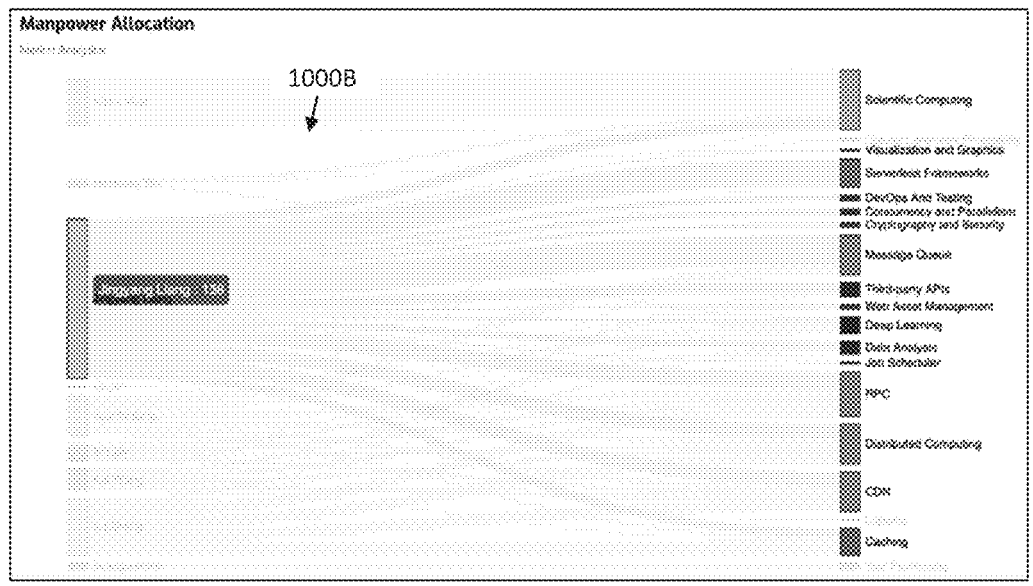
Figure 10C:
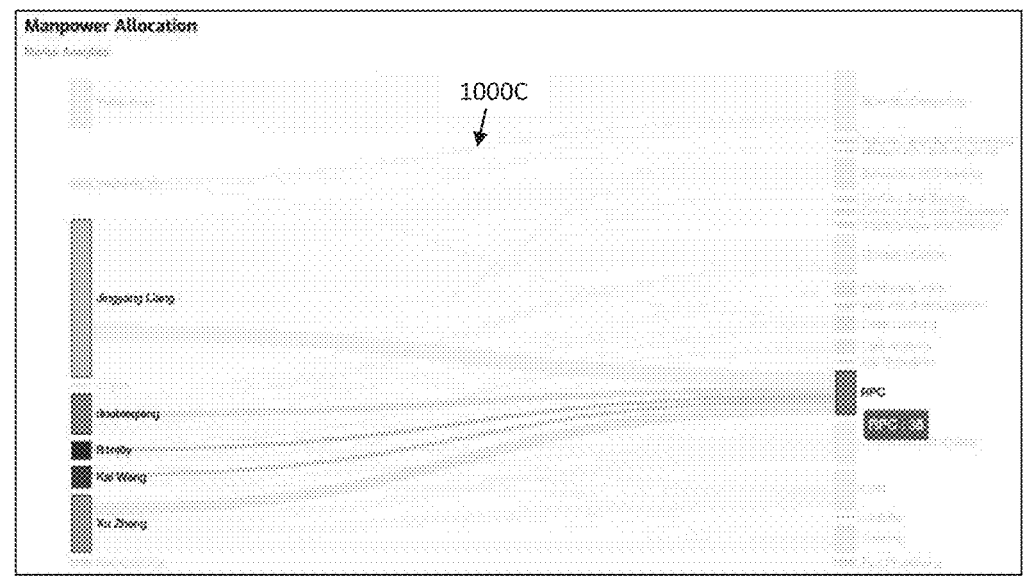

FIGS. 10A-10C shows an example views of example manpower allocation graphics generated by system 100. FIG. 10A shows an example manpower allocation graphic 1000A providing a visual indication of the relationships, indicating by lines of various width, between individual developers and various technical categories (or tasks) associated with the project. As shown, each developer may be related to one or more technical categories, and each technical category may be related to one or more developers. In one embodiment, the relationship may be determined by technical category tags in each developer's code, e.g., as discussed above regarding FIG. 8. Thus, manpower allocation graphic 1000A may represent a compilation of developer skill data indicated in the developer skill set graphic 800 for each respective developer. The width of each line in the manpower allocation graphic 1000A may indicate the amount of code or value of commits attributed to each developer for each respective technical category.

In one embodiment, a user may select an individual developer or an individual technical category to highlight the data relevant to that developer or technical category. FIG. 10B shows an example graphic 1000B resulting from the selection of a particular developer, showing the skill set of that developer, while FIG. 10C shows an example graphic 1000C resulting from the selection of a particular technical category, showing the developers that have contributed to that technical category, and a relative amount of contribution (indicated by line width) from each developer. manpower allocation graphics 1000A-C may be used for managing and adjusting manpower allocation to various areas of the software project, for example.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "unit", and "system" are intended to encompass hardware, software, firmware, or any combination thereof. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A system for evaluating code contributions to a software project by each of a plurality of software developers, the system comprising:
 at least one memory device storing:
  a code repository including a collection of code, the collection of code including a portion of code, including a plurality of functions, developed by each of the plurality of software developers; and
  a list of defined code impact categories for classifying commits according to their impact; and
 at least one processor communicatively coupled to the at least one memory device and configured to:
  access the collection of code from the code repository;
  parse the collection of code to generate abstract syntax trees (ASTs) representing the collection of code, or portions thereof, at multiple different times during the software project;
  perform a structural value analysis for each software developer by a structural value analysis including:
   generating at least one call-commit graph from the ASTs;
   performing a call-commit analysis of the at least one call-commit graph to analyze function calls and commits attributable to each software developer; and
   calculating a structural value score for each software developer based at least on the call-commit analysis;
  perform a non-structural value analysis for each software developer by a structural value analysis including:
   analyzing the ASTs to identify commits attributable to each software developer;
   performing a commit classification to classify each identified commit based on the list of defined code impact categories; and
   calculating a non-structural code impact score for each software developer based at least on the commit classification for commits attributable to that software developer;
  calculate a development value score for each software developer based on a plurality of development value score inputs including (a) the structural value score for each software developer and (b) the non-structural code impact score for each software developer; and
  display a representation of the development value score calculated for each software developer.

2. The system of claim 1, wherein:
 the at least one memory device stores a set of code quality rules;
 performing the non-structural value analysis for each software developer by the structural value analysis further includes:
  performing a code quality analysis by applying the set of code quality rules to the portion of code developed by each software developer; and
  calculating a non-structural code quality score for each software developer based at least on the code quality analysis; and
 the development value score for each software developer is calculated based on development value score inputs including (a) the structural value score for each software developer, (b) the non-structural code impact score for each software developer, and (c) the non-structural code quality score for each software developer.

3. The system of claim 2, wherein generating the at least one call-commit graph from ASTs comprises generating a call-commit graph representing (a) function call relationships between selected functions in the collection of code and (b) relationships between selected commits and functions influenced by the selected commits.

4. The system of claim 2, wherein generating the at least one call-commit graph from the ASTs comprises generating a call-commit graph including (a) first nodes representing functions in the collection of code and (b) second nodes representing commits.

5. The system of claim 1, wherein generating the at least one call-commit graph from the ASTs comprises generating a call-commit graph representing (a) function call relationships between selected functions in the collection of code and (b) relationships between selected commits and functions influenced by the selected commits.

6. The system of claim 1, wherein generating the at least one call-commit graph from the ASTs comprises generating a call-commit graph including (a) first nodes representing functions in the collection of code and (b) second nodes representing commits.

7. The system of claim 1, wherein calculating the development value score for each software developer based on the plurality of development value score inputs comprises:
accessing or determining a set of weighting values for the plurality of development value score inputs;
calculating the development value score for each software developer based on (a) the plurality of development value score inputs and (b) the set of weighting values.

8. The system of claim 7, wherein the at least one processor is configured to dynamically adjust the set of weighting values over time based on user input regarding comparisons or rankings of commits.

9. The system of claim 1, wherein performing the call-commit analysis of the at least one call-commit graph to analyze functions calls and commits attributable to each software developer comprises determining a number of function calls or probability of function calls for functions attributable to each software developer.

10. The system of claim 1, wherein analyzing the ASTs to identify commits attributable to each software developer comprises:
comparing multiple ASTs representing code snapshots at different times; and
identifying commits based on differences in the multiple compared ASTs.

11. The system of claim 1, wherein the list of defined code impact categories includes at least one of the following categories: feature, improvement, bug fix, and maintenance.

12. A method for evaluating code contributions to a software project by each of a plurality of software developers, the method comprising:
storing a code repository including a collection of code, the collection of code including a portion of code, including a plurality of functions, developed by each of the plurality of software developers;
storing a list of defined code impact categories for classifying commits according to their impact;
accessing the collection of code from the code repository;
parsing the collection of code to generate abstract syntax trees (ASTs) representing the collection of code, or portions thereof, at multiple different times during the software project;
performing a structural value analysis for each software developer by a structural value analysis including:
generating at least one call-commit graph from the ASTs;
performing a call-commit analysis of the at least one call-commit graph to analyze function calls and commits attributable to each software developer; and
calculating a structural value score for each software developer based at least on the call-commit analysis;
performing a non-structural value analysis for each software developer by a structural value analysis including:
analyzing the ASTs to identify commits attributable to each software developer;
performing a commit classification to classify each identified commit based on the list of defined code impact categories; and
calculating a non-structural code impact score for each software developer based at least on the commit classification for commits attributable to that software developer;
calculating a development value score for each software developer based on a plurality of development value score inputs including (a) the structural value score for each software developer and (b) the non-structural code impact score for each software developer; and
displaying a representation of the development value score calculated for each software developer.

13. The method of claim 12, wherein:
performing the non-structural value analysis for each software developer by the structural value analysis further includes:
performing a code quality analysis by applying a set of stored code quality rules to the portion of code developed by each software developer; and
calculating a non-structural code quality score for each software developer based at least on the code quality analysis; and
the development value score for each software developer is calculated based on development value score inputs including (a) the structural value score for each software developer, (b) the non-structural code impact score for each software developer, and (c) the non-structural code quality score for each software developer.

14. The method of claim 12, wherein generating the at least one call-commit graph from the ASTs comprises generating a call-commit graph representing (a) function call relationships between selected functions in the collection of code and (b) relationships between selected commits and functions influenced by the selected commits.

15. The method of claim 12, wherein generating the at least one call-commit graph from the ASTs comprises generating a call-commit graph including (a) first nodes representing functions in the collection of code and (b) second nodes representing commits.

16. The method of claim 12, wherein calculating the development value score for each software developer based on the plurality of development value score inputs comprises:
accessing or determining a set of weighting values for the plurality of development value score inputs; and
calculating the development value score for each software developer based on (a) the plurality of development value score inputs and (b) the set of weighting values.

17. The method of claim 16, further comprising dynamically adjusting the set of weighting values over time based on user input regarding comparisons or rankings of commits.

18. The method of claim 12, wherein performing the call-commit analysis of the at least one call-commit graph to analyze functions calls and commits attributable to each software developer comprises determining a number of function calls or probability of function calls for functions attributable to each software developer.

19. The method of claim 12, wherein analyzing the ASTs to identify commits attributable to each software developer comprises:
comparing multiple ASTs representing code snapshots at different times; and
identifying commits based on differences in the multiple compared ASTs.

20. The method of claim 12, wherein the list of defined code impact categories includes at least one of the following categories: feature, improvement, bug fix, and maintenance.

* * * * *